United States Patent [19]

Lin et al.

[11] Patent Number: 5,711,007
[45] Date of Patent: Jan. 20, 1998

[54] METHOD AND APPARATUS FOR TRANSMITTING AN OUTBOUND MESSAGE IN A TWO-WAY MESSAGING SYSTEM

[75] Inventors: Jyh-Han Lin, Keller; Samir Sawaya, Grapevine, both of Tex.

[73] Assignee: Motorola, Inc., Schaumburg, Ill.

[21] Appl. No.: 597,049

[22] Filed: Feb. 5, 1996

[51] Int. Cl.⁶ .......................... H04Q 7/20
[52] U.S. Cl. .............. 455/447; 455/456; 455/458; 455/31.3
[58] Field of Search .................. 455/33.1, 34.1, 455/34.2, 54.1, 56.1, 62, 63, 33.4, 446–447, 449–450, 456, 458, 31.3, 422, 455; 379/59, 60; 340/825.44, 311.1

[56] References Cited

U.S. PATENT DOCUMENTS

| | | |
|---|---|---|
| 4,875,038 | 10/1989 | Siwiak et al. |
| 5,038,399 | 8/1991 | Bruckert .................. 455/54.1 |
| 5,428,815 | 6/1995 | Grube ...................... 455/56.1 |
| 5,430,761 | 7/1995 | Bruckert et al. ............ 455/63 |
| 5,448,751 | 9/1995 | Takenaka et al. .......... 455/56.1 |

*Primary Examiner*—Nguyen T. Vo
*Attorney, Agent, or Firm*—R. Louis Breeden

[57] ABSTRACT

A method and apparatus is used for transmitting an outbound message (408) in a two-way messaging system having a plurality of cells employing frequency reuse. The controller (112) of the two-way messaging system divides ones of the plurality of cells into a plurality of rings based on radio frequency propagation and interference environment. The controller (112) then sends to a portable selective call transceiver (122) a notification of the outbound message (408). In response, the controller (112) receives information sufficient to determine an identity of one of the plurality of rings in which the portable selective call transceiver (122) has determined itself to be located, and transmits the outbound message (408) to the portable selective call transceiver (122), utilizing a frequency reuse plan in accordance with the identity.

15 Claims, 6 Drawing Sheets

METHOD AND APPARATUS FOR TRANSMITTING AN OUTBOUND MESSAGE IN A TWO-WAY MESSAGING SYSTEM

RELATED APPLICATIONS

Application Ser No. 08/476,771 filed Jun. 7, 1995 by Wang, entitled "Method and Apparatus for Scheduling Message Traffic in a Multicell Radio Communication System."

Application Ser No. 08/500,280 filed Jul. 10, 1995 by Wang et al., entitled "Flexible Mobility Management in a Two-Way Messaging System and Method Therefor."

Application Ser No. 08/502,399 filed Jul. 14, 1995 by Wang et al., entitled "System and Method for Allocating Frequency Channels in a Two-Way Messaging System."

Application Ser. No. 08,588,502 filed Jan. 18, 1996 by Hill et al., entitled "Method and Apparatus for Transmitting an Outbound Message in a Two-Way Messaging System."

FIELD OF THE INVENTION

This invention relates in general to two-way messaging systems, and in particular to two-way messaging systems employing frequency reuse.

BACKGROUND OF THE INVENTION

Current two-way messaging systems use frequency reuse to maximize the communication capacity of the system. The frequency reuse pattern traditionally includes a fixed number of communication cells. As the number of communication cells in the frequency reuse pattern decreases, the system capacity increases, as well as the noise interference of the communication system. In contrast, as the number of communication cells in the frequency reuse pattern increases, the system capacity decreases, as well as the noise interference.

The noise interference includes co-channel and adjacent channel interference. Co-channel interference occurs from communication cells utilizing the same communication frequency. Adjacent channel interference occurs from adjacent frequency channels where harmonic noise is coupled between channels.

Currently, selective call transceivers within the messaging system which experience severe noise interference cannot receive messages until the interference subsides, or the users of the selective call transceivers move to another location where the interference is less substantial. This situation can result in message latencies that are inconsistent with customer expectations.

Thus, what is needed is a method and apparatus that substantially reduces noise interference within the two-way messaging system thereby increasing the probability of message delivery to the selective call transceivers experiencing interference. In particular, the method and apparatus must maintain system capacity as high as possible, while at the same time decreasing system noise interference.

SUMMARY OF THE INVENTION

An aspect of the present invention is a method of transmitting an outbound message in a two-way messaging system having a plurality of cells employing frequency reuse. The method comprises in a fixed portion of the system the steps of dividing ones of the plurality of cells into a plurality of rings based on radio frequency propagation and interference environment, and sending to a portable selective call transceiver a notification of the outbound message. The method further comprises in the fixed portion of the system the steps of receiving in response information sufficient to determine an identity of one of the plurality of rings in which the portable selective call transceiver has determined itself to be located, and transmitting the outbound message to the portable selective call transceiver, utilizing a frequency reuse plan in accordance with said identity. The method further comprises in the portable selective call transceiver the steps of maintaining a record of N most recently received transmitter color codes, N being a predetermined integer value, and determining the identity of the one of the plurality of rings from the record, comprising the steps of selecting from the record a cell-identifying color code and a degree of consistency of reception of the cell-identifying color code; and deciding the identity of the one of the plurality of rings from the degree of consistency of reception; and reporting the identity to the fixed portion of the system.

A second aspect of the present invention is a controller for controlling a transmission of an outbound message from a fixed portion of a two-way messaging system having a plurality of cells employing frequency reuse. The controller comprises a processing system for directing operation of the controller, an input interface coupled to the processing system for accepting the outbound message from a user, and a radio interface coupled to the processing system for controlling a transmission of the outbound message to a portable selective call transceiver and a reception of a response from the portable selective call transceiver. The processing system is programmed for performing the steps of dividing ones of the plurality of cells into a plurality of rings based on radio frequency propagation and interference environment, and sending to the portable selective call transceiver a notification of the outbound message. The processing system is further programmed for receiving in response information sufficient to determine an identity of one of the plurality of rings in which the portable selective call transceiver to the is positioned, comprising the steps of receiving from the portable selective call transceiver a report of a color code and of a degree of consistency of reception of the color code; and determining said identity from said information. The processing system is further programmed for transmitting the outbound message portable selective call transceiver, utilizing a frequency reuse plan in accordance with said identity.

A third aspect of the present invention is a portable selective call transceiver for cooperating with a fixed portion of a two-way messaging system to control a transmission of an outbound message therefrom, the system having a plurality of cells employing frequency reuse. The portable selective call transceiver comprises an antenna for intercepting a radio signal comprising the outbound message, a receiver coupled to the antenna for demodulating the radio signal to derive the outbound message, a processing system coupled to the receiver for processing the outbound message, and a transmitter coupled to the processing system for transmitting a response to the fixed portion. The portable selective call transceiver further comprises a user interface coupled to the processing system for conveying the outbound message to a user, user controls coupled to the processing system for enabling control of the portable selective call transceiver by the user, and a memory coupled to the processing system for maintaining a record of N most recently received transmitter color codes, N being a predetermined integer value. The processing system is programmed for performing the steps of determining from the record information sufficient to determine an identity of one of a plurality of rings into which the plurality of cells have been divided based on radio frequency propagation and interference environment, comprising the steps of selecting from the record a cell-identifying color code and a degree of consistency of reception of the cell-indentifying color code, and deciding the indentity of the one of the plurality of rings from the degree of consistency of reception. The processing system is further programmed for reporting the information to the fixed portion of the system.

DESCRIPTION OF THE PREFERRED EMBODIMENT

Figure 1:
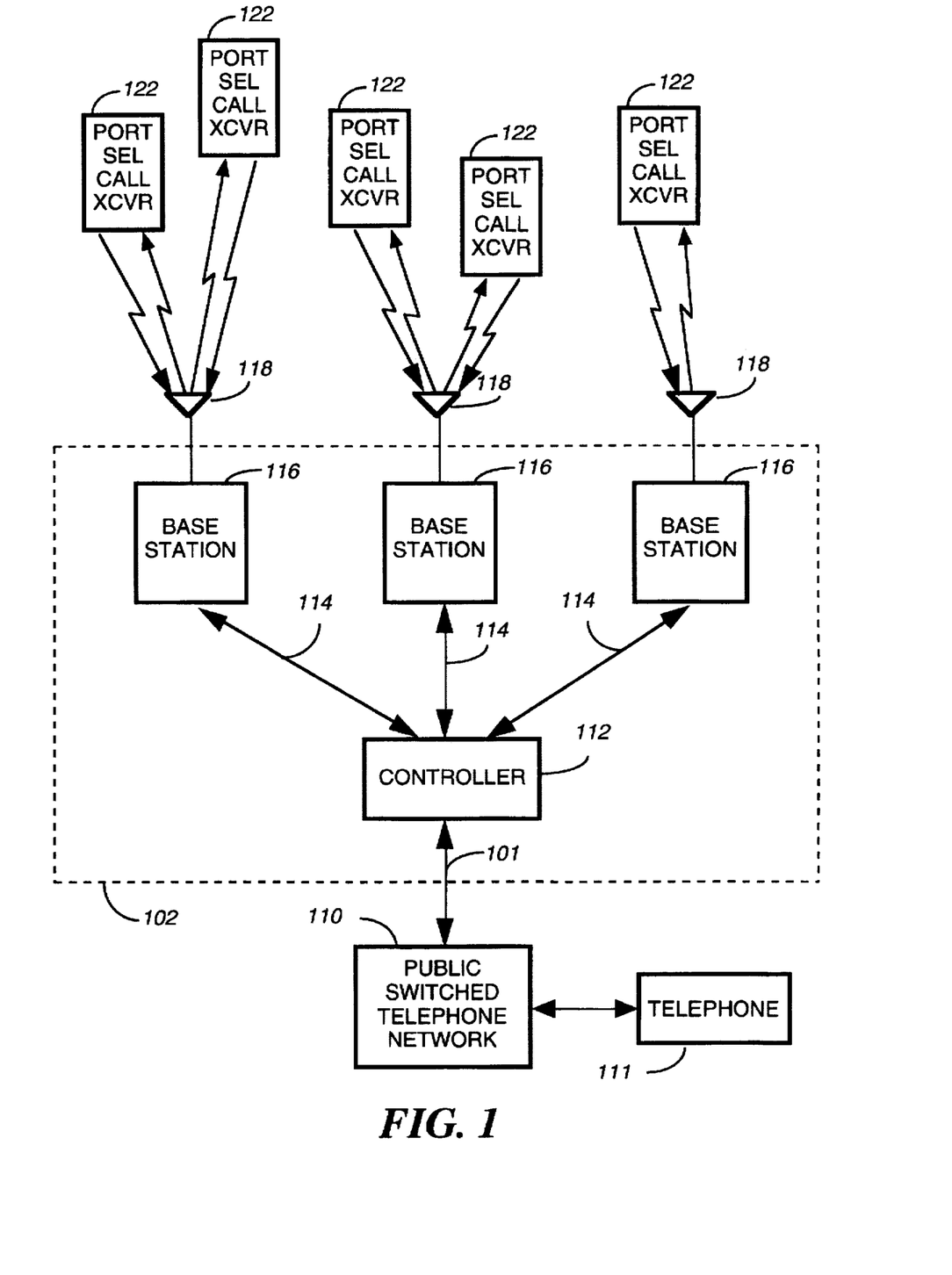
FIG. 1 is an electrical block diagram of a two-way messaging system in accordance with the preferred embodiment of the present invention.

FIG. 1 is an electrical block diagram of a two-way messaging system in accordance with the preferred embodiment of the present invention. The two-way messaging system comprises a fixed portion 102 including a controller 112 and a plurality of base stations 116, and a portable portion including a plurality of portable selective call transceivers 122. The base stations 116 are used for communicating with the portable selective call transceivers 122 utilizing conventional radio frequency (RF) techniques, and coupled by communication links 114 to the controller 112 which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receivers manufactured by Motorola, Inc. It will be appreciated that other similar hardware can be utilized for the controller 112 and the base stations 116.

Each of the base stations 116 transmits RF signals to the portable selective call transceivers 122 via a transceiver antenna 118. The base stations 116 each receive RF signals from the plurality of portable selective call transceivers 122 via the transceiver antenna 118. The RF signals transmitted by the base stations 116 to the portable selective call transceivers 122 (outbound messages) comprise selective call addresses identifying the portable selective call transceivers 122, and data or voice messages originated by a caller. The RF signals transmitted by the portable selective call transceivers 122 to the base stations 116 (inbound messages) comprise responses that include positive acknowledgment (ACK) messages, negative acknowledgments (NAKs), and portable selective call transceiver 122 ring identification messages in accordance with the present invention as will be described below. Inbound acknowledgeback messaging is more fully described in U.S. Pat. No. 4,875,038 issued Oct. 17, 1989 to Siwiak et al., which is hereby incorporated herein by reference.

The controller 112 preferably is coupled by telephone links 101 to a public switched telephone network (PSTN) 110 for receiving selective call originations therefrom. Selective call originations comprising voice and data messages from the PSTN 110 can be generated, for example, from a conventional telephone 111 coupled to the PSTN 110.

The protocol utilized for outbound and inbound messages is preferably similar to Motorola's well-known REFLEX™ digital selective call signaling protocol. This protocol utilizes well-known error detection and error correction techniques and is therefore tolerant to bit errors occurring during transmission, provided that the bit errors are not too numerous in any one code word. It will be appreciated that other suitable protocols such as, for example, InFLEXion™ can be used.

Figure 2:
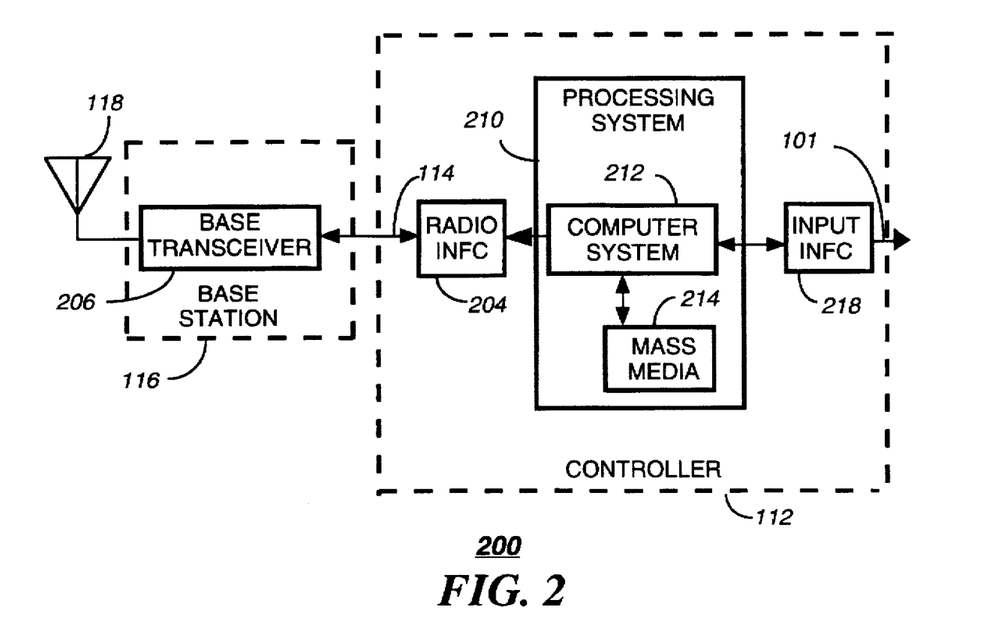
FIG. 2 is an electrical block diagram of a controller and a base station in accordance with the preferred embodiment of the present invention.

FIG. 2 is an electrical block diagram 200 of the controller 112 and the base station 116 in accordance with the preferred embodiment of the present invention. The controller 112 includes a processing system 210, a radio interface 204, and an input interface 218. The base station 116 includes a base transceiver 206.

The processing system 210 is used for directing operation of the controller 112. The processing system 210 preferably is coupled through the radio interface 204 to the base transceiver 206 via the communication link 114. The communication link 114 utilizes, for example, conventional means such as a direct wire line (telephone) link, a data communication link, or any number of radio frequency links, such as a radio frequency (RF) transceiver link, a microwave transceiver link, or a satellite link, just to mention a few. The processing system 210 is also coupled to the input interface 218 for accepting the outbound message originated by a user communicating with the PSTN 110 through the telephone links 101.

In order to perform the functions necessary for controlling the elements of the controller 112, as well as the elements of the base stations 116, the processing system 210 preferably includes a conventional computer system 212, and conventional mass storage media 214. The conventional mass storage media 214 includes, for example, subscriber user information such as addressing, programming options of the portable selective call transceiver 122, and tables of groups of portable selective call transceivers 122 for transmitting different frequency reuse patterns as will be described below.

The conventional computer system 212 is preferably programmed by way of software included in the conventional mass storage media 214. The conventional computer system 212 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing messages originated by callers using the PSTN 110, processing acknowledgments received from the portable selective call transceivers 122, and for protocol processing of messages destined for the portable selective call transceivers 122, just to mention a few. The conventional mass storage media 214 is preferably a conventional hard disk mass storage device.

It will be appreciated that other types of conventional computer systems 212 can be utilized, and that additional computer systems 212 and mass storage media 214 of the same or alternative type can be added as required to handle the processing requirements of the processing system 210.

Figure 3:
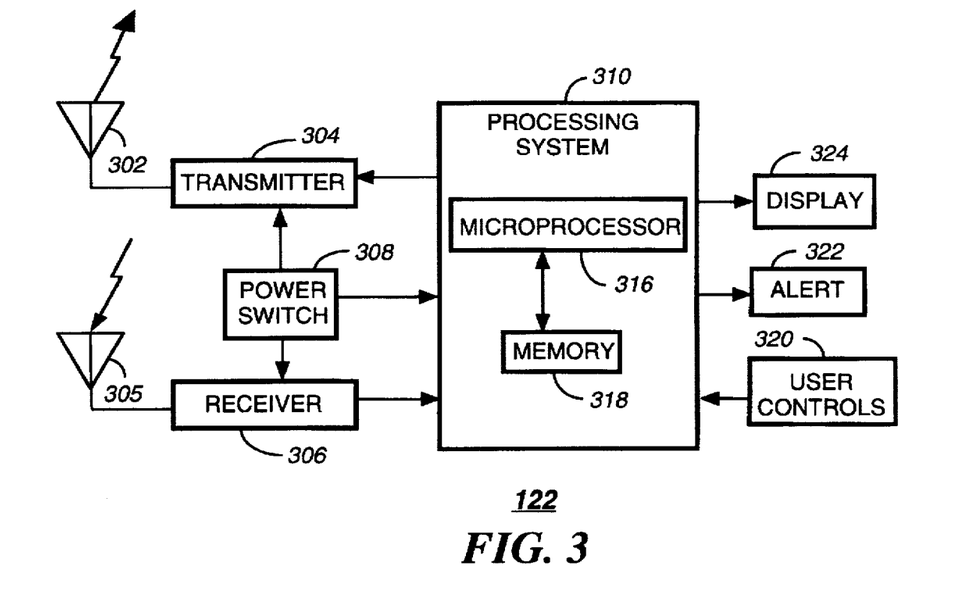
FIG. 3 is an electrical block diagram of a portable selective call transceiver according to the present invention.

FIG. 3 is an electrical block diagram of a portable selective call transceiver 122 according to the present invention. The portable selective call transceiver 122 comprises a transmitter antenna 302 for transmitting RF signals to the base stations 116, and a receiver antenna 305 for intercepting RF signals from the base stations 116. The transmitter antenna 302 is coupled to a conventional RF transmitter 304. Similarly, the receiver antenna 305 is coupled to a conventional RF receiver 306. It will be appreciated that, alternatively, the receiver 306 and transmitter 304 can be coupled to a single transceiver antenna, which transmits and intercepts RF signals to and from the base stations 116.

Radio signals received by the RF receiver 306 produce demodulated information at the output. The demodulated information is coupled to the input of a processing system 310 for directing operations of the portable selective call transceiver 122, and for processing outbound messages. Similarly, inbound messages are processed by the processing system 310 and delivered to the RF transmitter 304 for transmission to the base stations 116. A conventional power switch 308, coupled to the processing system 310, controls the supply of power to the RF transmitter 304 and RF receiver 306, thereby providing a battery saving function.

To perform the necessary functions of the portable selective call transceiver 122, the processing system 310 includes a microprocessor 316, and a memory 318. The microprocessor 316 is, for example, embodied by the M68HC08 micro-controller manufactured by Motorola, Inc. The memory 318 preferably includes a conventional read-only memory (ROM) and a conventional random-access memory (RAM).

The microprocessor 316 is programmed by way of the memory 318 to process received outbound messages, and in response thereto to create and format inbound messages. During outbound message processing, the microprocessor 316 samples the demodulated signal generated by the RF receiver 306. The microprocessor 316 then decodes an address in the demodulated data of the outbound message, compares the decoded address with one or more addresses stored in the memory 318, and when a match is detected, proceeds to read the transmitter color code received in the outbound message. The microprocessor 316 then stores the transmitter color code in the memory 318 for maintaining a record of N most recently received transmitter color codes, N being a predetermined integer value.

Once the microprocessor 316 has processed the message, it stores the message in the memory 318, and a call alerting signal is generated to alert a user that a message has been received. The call alerting signal is directed to a conventional audible or tactile alerting device 322 for generating an audible or tactile call alerting signal. By the use of appropriate functions provided by the user controls 320, the outbound message is recovered from the memory 318, and displayed on a display 324, e.g., a conventional liquid crystal display (LCD). Alternatively, when the message is a voice message, the message is played out on a conventional audio circuit (not shown in FIG. 3) that is included in the portable selective call transceiver 122.

Figure 4:
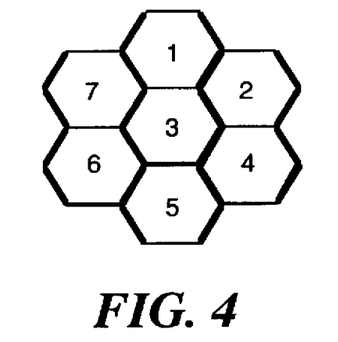
FIGS. 4, and 5 are examples of frequency reuse patterns utilized by the two-way messaging system.
Figure 5:
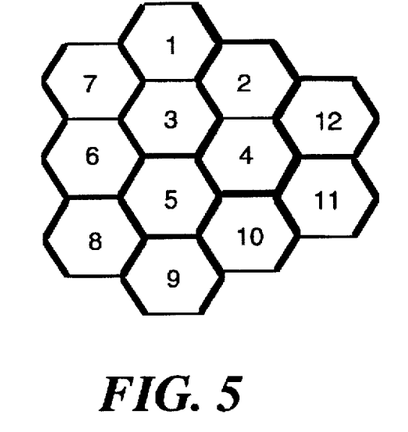

FIGS. 4, and 5 are examples of a two-way messaging system having a plurality of cells employing frequency reuse patterns. FIG. 4 illustrates a frequency reuse pattern with seven cells. If, for example, the two-way messaging system has twenty-one communication frequencies, then each cell would utilize an average of three unique frequencies. As the seven cells are repeated throughout the communication system, each cell receives several sources of communication interference.

These sources include co-frequency (or co-channel) interference, and adjacent channel interference. Co-channel interference is caused by multiple cells utilizing the same communication frequency. The communication system is designed to place cells utilizing the same communication frequency as far apart as allowed by the frequency reuse pattern. Adjacent channel interference occurs from communication frequencies that are adjacent to each other in the frequency spectrum. Another source of interference always present in the two-way messaging system is transceiver noise inherent in the base transceivers 206 and portable selective call transceivers 122.

Co-channel and adjacent channel interference can be reduced by changing the frequency reuse pattern. For example, FIG. 5 illustrates a frequency reuse pattern including twelve cells. In a two-way messaging system utilizing twenty-one communication frequencies, each cell could use an average of 1.75 frequencies. The change in the frequency reuse pattern reduces the system capacity by approximately 42 percent. However, the distance between cells utilizing the same communication frequencies has been increased, thereby reducing co-channel interference. In addition, since there are fewer frequencies present within each cell, adjacent channel interference is reduced.

Given a propagation loss exponent of 3.5, a seven cell frequency reuse pattern has approximately a 15 dB signal-to-interference (S/I) ratio at each cell boundary, and a twelve cell frequency reuse pattern has approximately a 19 dB S/I ratio. Thus, when one or more selective call transceivers 122 are experiencing severe interference, an alteration of the frequency reuse pattern can reduce the interference and allow for communication to be completed. Altering the frequency reuse also increases the maximum capacity of the system by reducing the number of retries performed for units experiencing severe interference.

Figure 6:
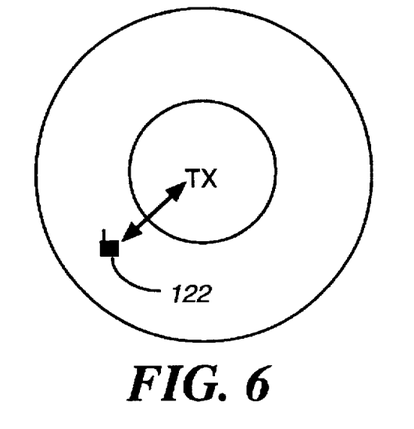
FIG. 6 is an illustration of a multi-ring cell according to the present invention.

FIG. 6 is an illustration of a multi-ring cell according to the present invention. The controller 112 is programmed for dividing ones of the plurality of cells included in a frequency reuse pattern (e.g., FIG. 4) into a plurality of rings based on radio frequency propagation and interference environment. In this illustration, a transmission cell comprises two rings. The inner ring includes the base transceiver 206 of the base station 116. Portable selective call transceivers 122 are located somewhere within these rings. In this example, a portable selective call transceiver 122 is located outside the inner ring and inside the outer ring. By repetitively identifying the color code of a base transceiver 206, the portable selective call transceiver 122 identifies its location within the rings, as will be described further below. This information is then relayed to the controller 112 to allow it to determine the best mode of communication.

Figure 7:
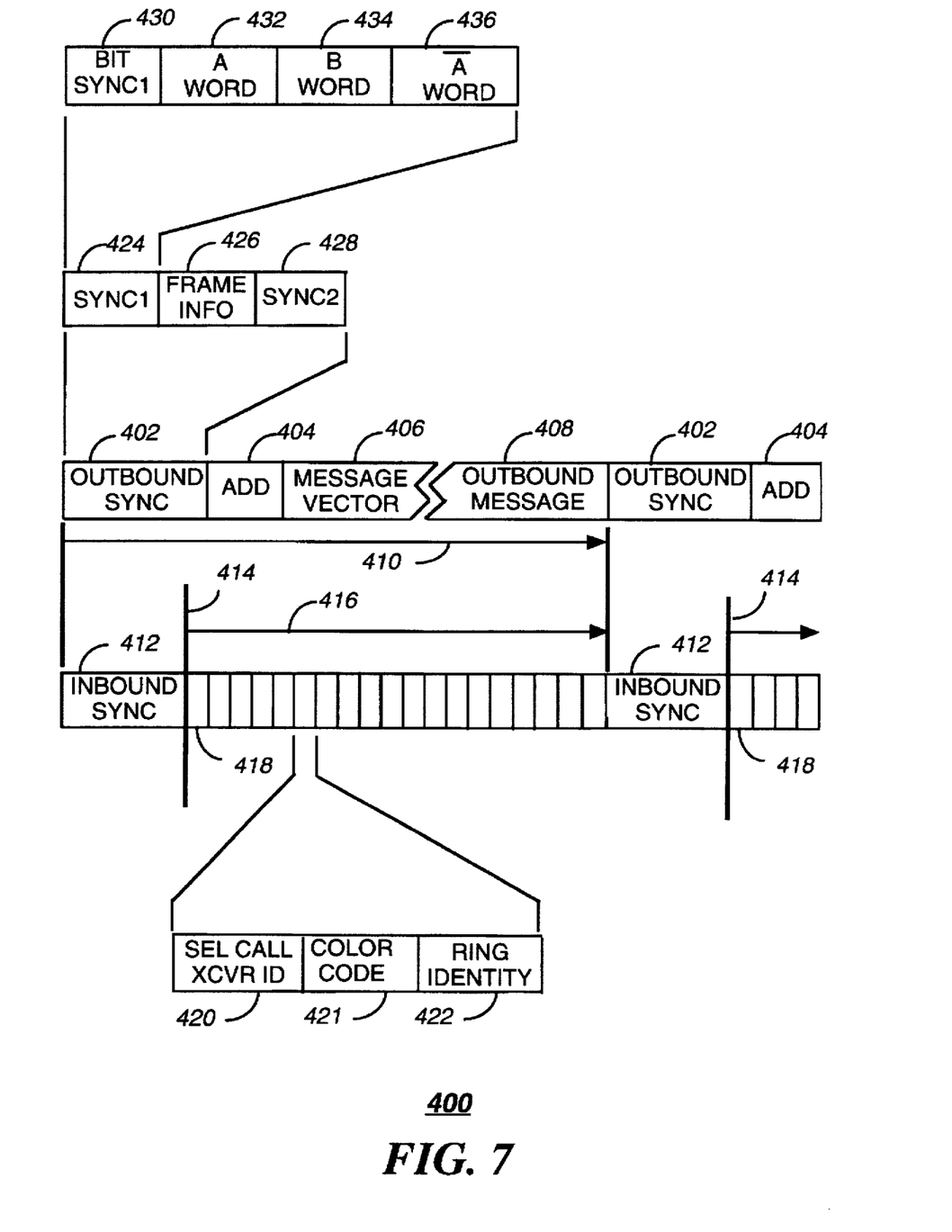
FIG. 7 is a timing diagram of a communication protocol utilized by the two-way communication system in accordance with the present invention.

FIG. 7 is a timing diagram of a communication protocol utilized by the two-way messaging system in accordance with the present invention. The signaling format operating on the outbound and inbound channels preferably operates on independent frequencies utilizing conventional frequency division multiplexing (FDM). Using FDM transmission, both outbound and inbound RF channel transmissions are depicted during a time interval 410.

The elements of the outbound protocol comprise an outbound sync 402, a selective call address 404, a message vector 406 and an outbound message 408. The outbound sync 402 includes a sync1 field 424, a frame information field 426, and a sync2 field 428. The sync1 field 424 comprises a bit sync1 field 430, an A word 432, a B word 434, and an inverted A word 436. The bit sync1 field 430 provides the portable selective call transceiver 122 a means for synchronization utilizing techniques well known in the art. The A word 432 identifies the protocol version used, that is, FLEX™, InFLEXion™, or ReFLEX™. The B word 434 comprises one of one hundred twenty eight possible sixteen bit color codes corresponding to a transmitter of the base stations 116. The transmitter color code is utilized by the portable selective call transceiver 122 to determine its ring location in a cell. The inverted A word 436 is used as redundant information for further verification of the integrity of the control channel information.

The selective call address 404 identifies the portable selective call transceiver 122 for which the outbound message 408 is intended. The message vector 406 points in time within the signal format to the position of the outbound message 408 to be received by the portable selective call transceiver 122, and specifies a radio frequency for receiving the message. The message vector 406 further provides information to the portable selective call transceiver 122 identifying a scheduled time slot for acknowledging the message transaction.

The elements of the inbound protocol comprise an inbound sync 412, and scheduled time slots 418. The inbound sync 412 provides the base stations 116 a means for synchronization utilizing techniques well known in the art. Scheduled messages commence after the inbound sync 412 at a time boundary 414. A transmission time interval 416 depicts the time interval for scheduled transmissions on scheduled time slots 418 from the portable selective call transceivers 122. Scheduled inbound messages preferably comprise a selective call transceiver identification number 420, a color code 421, and a ring identity 422. The selective call transceiver identification number 420 is preferably the address of the portable selective call transceiver 122. The color code 421 is the color code received by the portable selective call transceiver 122. The ring identity 422 is the ring position identified by the portable selective call transceiver 122.

Alternatively, instead of sending the ring identity 422, the portable selective call transceiver 122 can send information sufficient for the fixed portion 102 to determine the ring identity 422. The information can include, for example, an indication of color code reception quality, as described further below.

Figure 8:
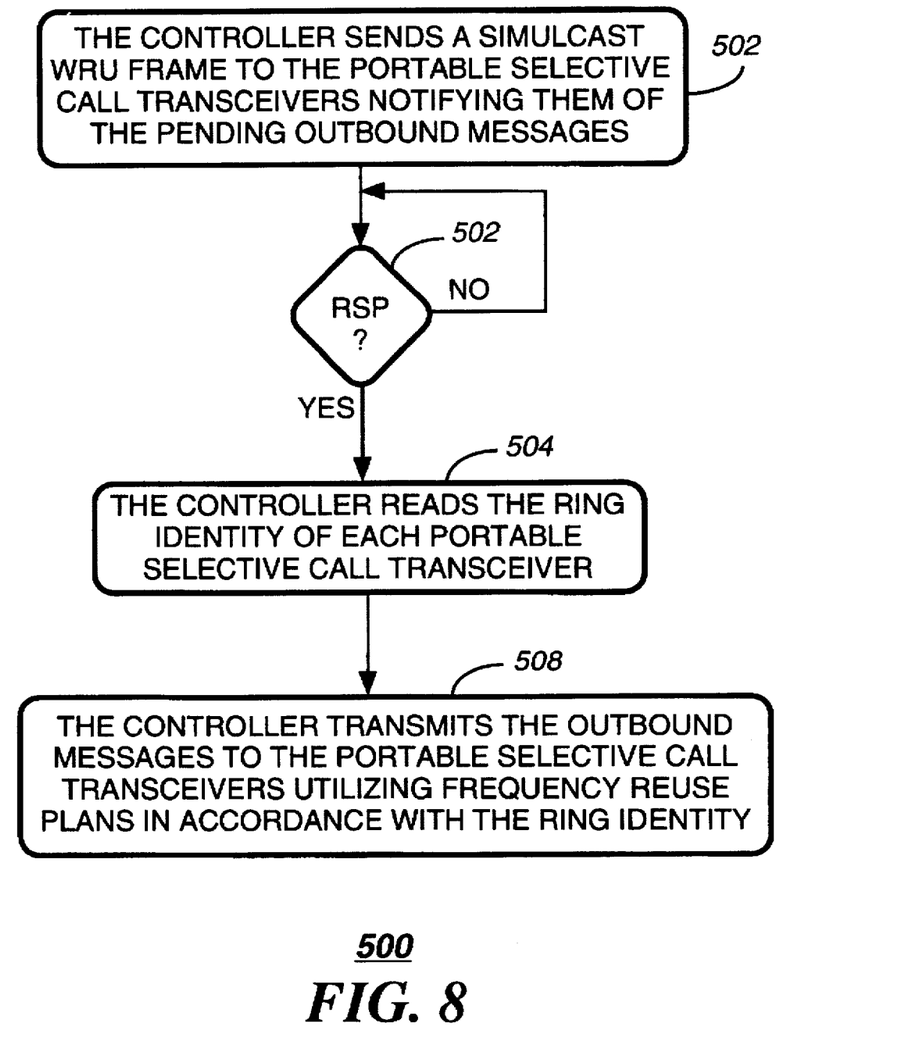
FIG. 8 depicts a flow chart of the controller operation in accordance with the preferred embodiment of the present invention.

FIG. 8 depicts a flow chart 500 of the controller 112 operation in accordance with the preferred embodiment of the present invention. The flow chart 500 begins with step 502 where the controller 112 is programmed to send a Where are you (WRU) frame to the portable selective call transceivers 122 providing notification of outbound messages for the portable selective call transceivers 122. In step 502, the controller 112 waits for responses from the portable selective call transceivers 122. Once a response from a portable selective call transceiver 122 is received, the controller 112 reads the ring identity 422 identifying one of the plurality of rings in which the portable selective call transceiver 122 has determined itself to be located. In step 506 the controller 112 transmits the outbound message to the portable selective call transceiver 122, utilizing a frequency reuse plan in accordance with the ring identity received.

Alternatively, instead of reading the ring identity 422, the controller can read information sufficient to determine the ring identity 422. The information can include, for example, an indication of color code reception quality, as described further below.

The transmitting step 506 comprises any combination of three embodiments. In a first embodiment, the controller 112 is programmed to queue the outbound message of a portable selective call transceiver 122 in a transmission queue along with other outbound messages for other portable selective call transceivers 122 having reported similar ring identities, and transmits the outbound message along with the other outbound messages from the transmission queue utilizing a frequency reuse plan in accordance with the ring identity of the queued messages. In selecting a frequency reuse plan, the controller 112 is further programmed to designate a plurality of fixed frequency reuse plans, and select one of the plurality of fixed frequency reuse plans, in response to the ring identity 422 of the one of the plurality of rings. The fixed frequency reuse plans can be, for example, those shown in FIGS. 4 and 5.

When, for example, the ring identity 422 received from a portable selective call transceiver 122 identifies the inner ring of a cell such as the one shown in FIG. 6, the controller 112 selects the frequency reuse plan of FIG. 4. Portable selective call transceivers 122 located in the inner ring receive strong RF signals from the cell, because of their proximity to the transmitter of the cell. In selecting the frequency reuse plan of FIG. 4, the capacity of portable selective call transceivers 122 is increased, while the interference is also increased. However, because of the proximity of the portable selective call transceivers 122 to the transmitter of the cell, the higher interference is compensated by the strong RF signals received by the portable selective call transceivers 122.

Similarly, a ring identity 422 which identifies the outer ring of FIG. 6 results in the selection of the frequency reuse plan of FIG. 5. In contrast to portable selective call transceivers 122 located in the inner ring, those located in the outer ring potentially receive weak RF signals from the cell, because of the greater distance of the portable selective call transceivers 122 from the transmitter of the cell. In selecting the frequency reuse plan of FIG. 5, the capacity of portable selective call transceivers 122 is decreased. However, the interference is also reduced, which compensates for the weak RF signals received by the portable selective call transceivers 122.

Thus, once the controller 112 has received the ring identities from a group of portable selective call transceivers 122, the controller 112 queues the portable selective call transceivers 122 of the inner and outer rings separately, and transmits the outbound messages at different times utilizing the frequency reuse plans of FIGS. 4 and 5, respectively.

In a second embodiment, the controller 112 is programmed to dynamically allocate transmission channels by adjusting a transmitter exclusion table, in response to the identity of the one of the plurality of rings. The transmitter exclusion table can be adjusted by, for example, utilizing a relaxation factor (e.g., r>1) that effectively reduces the transmitter exclusion table variables (e.g., $E_{i1}/r$, $E_{i2}/r$, etc.) for base transceivers 206 that are communicating with portable selective call transceivers 122 that are in close proximity to them, determined by the ring identity 422. A detailed description of exclusion transmitter tables is more fully described in application Ser. No. 08/476,771 filed Jun. 7, 1995 by Wang, entitled "Method and Apparatus for Scheduling Message Traffic in a Multicell Radio Communication System," which is hereby incorporated herein by reference.

In a third embodiment, the controller 112 is programmed to adjust transmission power of the base transceivers 206 in response to the ring identity 422 of the one of the plurality of rings. Preferably, the transmission power is increased for those portable selective call transceivers 122 determined to be in rings that are distant from the base transceivers 206.

In a fourth embodiment, the controller 112 is programmed to adjust a data rate utilized for the outbound messages in accordance with the ring identity 422. For example, a slower (more reliable) data rate, such as 1600 bits per second (bps) can be utilized for a portable transceiver 122 having a ring identity 422 which indicates that the portable transceiver 122 is distant (e.g., more than halfway to the cell boundary) from the base transceiver 206, while a faster data rate, such as 3200 or 6400 bps can be utilized for a portable transceiver 122 having a ring identity 422 which indicates that the portable transceiver 122 is closer to the base transceiver 206.

Figure 9:
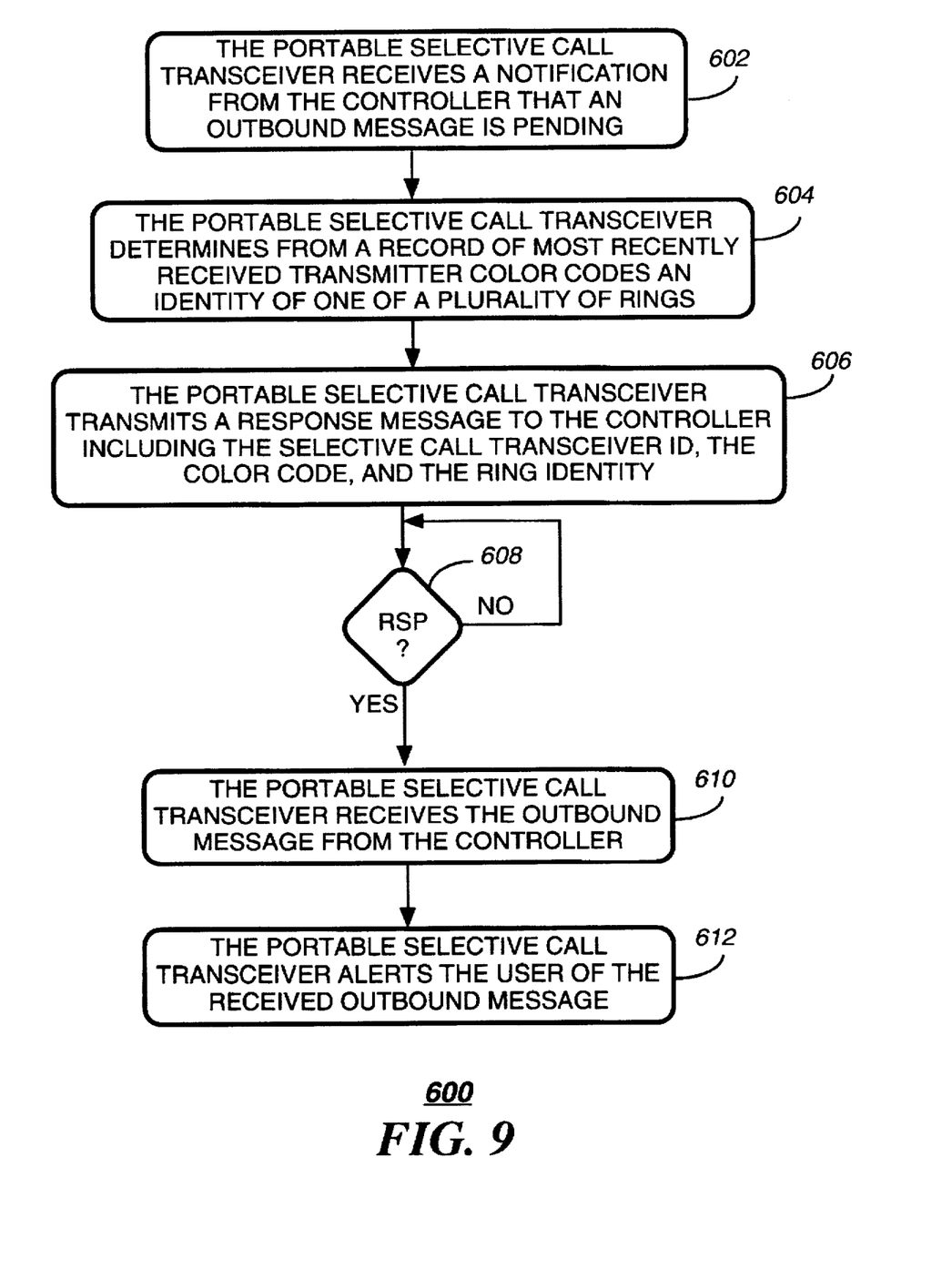
FIG. 9 depicts a flow chart of the portable selective call transceiver operation in accordance with the preferred embodiment of the present invention.

FIG. 9 depicts a flow chart 600 of the portable selective call transceiver 122 operation in accordance with the preferred embodiment of the present invention. The flow chart 600 begins with step 602 where the portable selective call transceiver 122 receives a notification from the controller 112 that an outbound message is pending. In step 604 the portable selective call transceiver 122 determines from a record of most recently received transmitter color codes stored in the memory 318 a ring identity of one of a plurality of rings into which the plurality of cells have been divided based on radio frequency propagation and interference environment.

The step of selecting a color code to transmit back to the controller 112 comprises the steps of recording a plurality of predetermined weighting factors corresponding to each color code received and decoded, summing the plurality of predetermined weighting factors corresponding to each unique color code received, thereby forming at least one sum, and defining the cell-identifying color code to be the color code corresponding to a largest value included in the at least one sum. For example, let the weighting factors equal 1, 2, 3, 4, 5, 6, 7, and 8 in a window of eight color code receptions, and let a color code window of eight color codes received equal cc1,cc1,cc3,cc2,cc1,cc3,cc1 and cc2 (most recently received color code). The weighting factors given result in the sum cc1 equals 15, cc2 equals 12, and cc3 equals 9. Thus color code cc1 having the largest sum is the color code reported to the controller 112.

The step of determining the ring identity comprises the steps of selecting from the record stored in the memory 318 of the portable selective call transceiver 122 a cell-identifying color code and a degree of consistency of reception of the cell-identifying color code, and deciding the identity of the one of the plurality of rings from the degree of consistency of reception. For example, a color code received with eight occurrences identifies a first ring, a color code received with seven occurrences identifies a second ring, a color code received with five or six occurrences identifies a third ring, and a color code received with four or less occurrences identifies a fourth ring. In this example the first ring is the inner most ring (closest to the transmitter) and the fourth ring the outermost ring (farthest from the transmitter). Once a ring is identified by the portable selective call transceiver 122, the portable selective call transceiver 122 sends the ring identity 422 to the controller 112.

It will be appreciated that other ring identification methods can be used that are appropriate in the two-way messaging system. For example, instead of determining and reporting the ring identity 422 in the portable selective call transceiver 122, the portable selective call transceiver 122 can merely report the color code and the degree of consistency of reception of the color code. From that information, the controller 112 can then determine the ring identity 422.

Once the portable selective call transceiver 122 transmits the response message including the selective call transceiver ID 420, the color code 421, and the ring identity 422 to the controller 112, it proceeds to step 606 where it transmits in scheduled time slots 418 a response message to the controller 112 with the ring identity 422. In step 608 the portable selective call transceiver 122 waits for the outbound message 408 from the controller 112. In step 610 the portable selective call transceiver 122 receives the outbound message from the controller 112. The portable selective call transceiver 122 then proceeds in step 612 to alert the user of the outbound message received.

Thus, it should be apparent by now that the present invention provides a novel method and apparatus for substantially reducing communication interference in a communication system utilizing frequency reuse. In particular, the present invention provides a method and apparatus for determining ring locations of portable selective call transceivers within a coverage cell area. The present invention provides for grouping portable selective call transceivers reporting the same ring identity, and in response adjusting frequency reuse plans statically or dynamically, adjusting transmitter exclusion tables, and adjusting transmitter power.

What is claimed is:

1. A method of transmitting an outbound message in a two-way messaging system having a plurality of cells employing frequency reuse, the method comprising in a fixed portion of the system the steps of:

dividing ones of the plurality of cells into a plurality of rings based on radio frequency propagation and interference environment;

sending to a portable selective call transceiver a notification of the outbound message;

receiving in response information sufficient to determine an identity of one of the plurality of rings in which the portable selective call transceiver has determined itself to be located; and transmitting the outbound message to the portable selective call transceiver, utilizing a frequency reuse plan in accordance with said identity, wherein the method further comprises in the portable selective call transceiver the steps of:

maintaining a record of N most recently received transmitter color codes, N being a predetermined integer value;

determining the identity of the one of the plurality of rings from the record, comprising the steps of:

selecting from the record a cell-identifying color code and a degree of consistency of reception of the cell-identifying color code; and deciding the identity of the one of the plurality of rings from the degree of consistency of reception; and reporting the identity to the fixed portion of the system.

2. The method of claim 1, wherein the transmitting step comprises the steps of:

queuing the outbound message in a transmission queue along with other outbound messages for other selective call transceivers having similar ring identities; and transmitting the outbound message along with the other outbound messages from the transmission queue.

3. The method of claim 1, wherein the transmitting step comprises the step of dynamically allocating transmission channels by adjusting a transmitter exclusion table, in response to the identity of the one of the plurality of rings.

4. The method of claim 1, wherein the transmitting step comprises the steps of:

designating a plurality of fixed frequency reuse plans; and selecting one of the plurality of fixed frequency reuse plans, in response to the identity of the one of the plurality of rings.

5. The method of claim 1, further comprising the step of adjusting transmission power in response to the identity of the one of the plurality of rings.

6. The method of claim 1, further comprising the step of adjusting a transmission data rate in response to the identity of the one of the plurality of rings.

7. The method of claim 1, wherein the selecting step comprises the steps of:

recording a plurality of predetermined weighting factors corresponding to each color code received and decoded;

summing the plurality of predetermined weighting factors corresponding to each unique color code received, thereby forming at least one sum; and defining the cell-identifying color code to be the color code corresponding to a largest value included in the at least one sum.

8. A controller for controlling a transmission of an outbound message from a fixed portion of a two-way messaging system having a plurality of cells employing frequency reuse, the controller comprising:

a processing system for directing operation of the controller;

an input interface coupled to the processing system for accepting the outbound message from a user;

a radio interface coupled to the processing system for controlling a transmission of the outbound message to a portable selective call transceiver and a reception of a response from the portable selective call transceiver, wherein the processing system is programmed for performing the steps of:

dividing ones of the plurality of cells into a plurality of rings based on radio frequency propagation and interference environment;

sending to the portable selective call transceiver a notification of the outbound message;

receiving in response information sufficient to determine an identity of one of the plurality of rings in which the portable selective call transceiver is positioned, comprising the steps of:

receiving from the portable selective call transceiver a report of a color code and of a degree of consistency of reception of the color code; and determining said identity from said information; and transmitting the outbound message to the portable selective call transceiver, utilizing a frequency reuse plan in accordance with said identity.

9. The controller of claim 8, wherein the transmitting step comprises the steps of:

queuing the outbound message in a transmission queue along with other outbound messages for other selective call transceivers having similar ring identities; and transmitting the outbound message along with the other outbound messages from the transmission queue.

10. The controller of claim 8, wherein the transmitting step comprises the step of dynamically allocating transmission channels by adjusting a transmitter exclusion table, in response to the identity of the one of the plurality of rings.

11. The controller of claim 8, wherein the transmitting step comprises the steps of:

designating a plurality of fixed frequency reuse plans; and selecting one of the plurality of fixed frequency reuse plans, in response to the identity of the one of the plurality of rings.

12. The controller of claim 8, wherein the processing system is further programmed for performing the step of adjusting transmission power in response to the identity of the one of the plurality of rings.

13. The controller of claim 8, wherein the processing system is further programmed for performing the step of adjusting a transmission data rate in response to the identity of the one of the plurality of rings.

14. A portable selective call transceiver for cooperating with a fixed portion of a two-way messaging system to control a transmission of an outbound message therefrom, the system having a plurality of cells employing frequency reuse, the portable selective call transceiver comprising:

an antenna for intercepting a radio signal comprising the outbound message;

a receiver coupled to the antenna for demodulating the radio signal to derive the outbound message;

a processing system coupled to the receiver for processing the outbound message;

a transmitter coupled to the processing system for transmitting a response to the fixed portion;

a user interface coupled to the processing system for conveying the outbound message to a user;

user controls coupled to the processing system for enabling control of the portable selective call transceiver by the user; and a memory coupled to the processing system for maintaining a record of N most recently received transmitter color codes, N being a predetermined integer value, wherein the processing system is programmed for performing the steps of:

determining from the record information sufficient to determine an identity of one of a plurality of rings into which the plurality of cells have been divided based on radio frequency propagation and interference environment, comprising the steps of:

selecting from the record a cell-identifying color code and a degree of consistency of reception of the cell-identifying color code; and deciding the identity of the one of the plurality of rings from the degree of consistency of reception; and reporting the information to the fixed portion of the system.

15. The portable selective call transceiver of claim 14, wherein the selecting step comprises the steps of:

recording a plurality of predetermined weighting factors corresponding to each color code received and decoded;

summing the plurality of predetermined weighting factors corresponding to each unique color code received, thereby forming at least one sum; and defining the cell-identifying color code to be the color code corresponding to a largest value included in the at least one sum.

* * * * *